United States Patent
Dhua et al.

(10) Patent No.: US 10,595,179 B2
(45) Date of Patent: *Mar. 17, 2020

(54) LISTING SERVICE REGISTRATIONS THROUGH A MOBILE NUMBER

(71) Applicant: International Business Machines Corporation, Armonk, NY (US)

(72) Inventors: Silpi Dhua, Kolkata (IN); Sujoy Sett, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/291,933

(22) Filed: Mar. 4, 2019

(65) Prior Publication Data

US 2019/0200195 A1 Jun. 27, 2019

Related U.S. Application Data

(63) Continuation of application No. 15/806,948, filed on Nov. 8, 2017, now Pat. No. 10,313,854.

(51) Int. Cl.
*H04W 4/50* (2018.01)
*H04W 60/02* (2009.01)
(Continued)

(52) U.S. Cl.
CPC ............ *H04W 4/50* (2018.02); *H04L 51/12* (2013.01); *H04W 4/12* (2013.01); *H04W 4/60* (2018.02);
(Continued)

(58) Field of Classification Search
CPC ......... H04W 4/50; H04W 4/12; H04W 8/205; H04W 60/02; H04L 51/12
See application file for complete search history.

(56) References Cited

U.S. PATENT DOCUMENTS 6,738,633 B2 * 5/2004 Kim .................. H04Q 3/005
455/461
8,594,996 B2 11/2013 Liang et al.
(Continued)

FOREIGN PATENT DOCUMENTS

KR 20040066795 A * 7/2004 ........... A61B 5/0048

OTHER PUBLICATIONS

Dhua et al., "Listing Service Registrations Through a Mobile Number," U.S. Appl. No. 15/806,948, filed Nov. 8, 2017, 38 pages.
(Continued)

*Primary Examiner* — Julio R Perez
(74) *Attorney, Agent, or Firm* — VanLeeuwen & VanLeeuwen; William J. Stock

(57) ABSTRACT

An approach is provided in which an information handling system identifies registration-based messages sent from services over a computer network to a mobile device. The registration-based messages correspond to registering a first mobile number assigned to the mobile device to the plurality of services. The information handling system then combines registration information extracted from each of the registration-based messages into a set of registration results. Next, the information handling system identifies a set of transaction results corresponding to transactions between the first mobile number and at least one of the services, and generates an analytics report based on performing statistical analysis on the set of transaction results and the set of registration results. In turn, the information handling system provides the set of registration results and the analytics report to a user assigned to the mobile number.

20 Claims, 10 Drawing Sheets

(51) Int. Cl.
*H04L 12/58* (2006.01)
*H04W 4/12* (2009.01)
*H04W 8/20* (2009.01)
*H04W 4/60* (2018.01)
*H04L 29/08* (2006.01)

(52) U.S. Cl.
CPC .......... *H04W 8/205* (2013.01); *H04W 60/02* (2013.01); *H04L 67/2838* (2013.01)

(56) References Cited

U.S. PATENT DOCUMENTS

| | | | |
|---|---|---|---|
| 8,868,670 B2 | 10/2014 | Bagga et al. | |
| 9,613,004 B2 | 4/2017 | Liang et al. | |
| 2004/0066795 A1* | 4/2004 | Zhang | H04W 52/54 370/442 |
| 2007/0250829 A1* | 10/2007 | Hillier | H04L 41/022 717/170 |
| 2007/0293247 A1 | 12/2007 | Bhat et al. | |
| 2009/0319334 A1* | 12/2009 | Dhananjaya | G06Q 10/06 705/7.29 |
| 2013/0185383 A1 | 7/2013 | Anderson | |
| 2014/0156760 A1 | 6/2014 | Zheng et al. | |
| 2014/0273965 A1* | 9/2014 | Raleigh | H04W 12/04 455/411 |
| 2014/0344370 A1* | 11/2014 | Kadashevich | H04L 67/306 709/206 |
| 2015/0373206 A1 | 12/2015 | Mohammed et al. | |
| 2017/0142214 A1 | 5/2017 | Nanavati et al. | |
| 2017/0180505 A1 | 6/2017 | Shaw et al. | |
| 2017/0331774 A1 | 11/2017 | Peck-Walden et al. | |
| 2018/0075530 A1 | 3/2018 | Kavanagh et al. | |

OTHER PUBLICATIONS

Dhua et al., "Listing Service Registrations Through a Mobile Number," U.S. Appl. No. 16/291,903, filed Mar. 4, 2019, 38 pages.
Dhua et al., "Listing Service Registrations Through a Mobile Number," U.S. Appl. No. 16/291,953, filed Mar. 4, 2019, 37 pages.
"List of IBM Patents or Patent Applications Treated as Related," Letter from Leslie A. Van Leeuwen, Mar. 5, 2019, 1 page.

* cited by examiner

Collected Messages
600

6/1/2017: Your five digit code to register Application B is 54321. — 610

7/1/2017: You have successfully registered Application A. — 620

7/2/2017: Log in today to receive a free gift. — 630

8/1/2017: Thank you for purchasing XYZ through Application A for the amount of $125. Your invoice number is 69483. — 640

The service request for application A has been received. It will be handled in next two business day. — 650

Executive from service B has contacted you for issue resolution. Please let us know your satisfaction score. — 660

Your request to enable internet service from X company has been approved. — 670

The payment for transaction Y for Application C has been received on DD-MMM-YYYY. — 680

The order Number XXX from Application D has been delivered today. Please call XXX if not received. — 690

FIG. 6

Analytics 385

APPLICATION C
- Generalizations:
  o First registration noted on DD-MMM-YYYY HH:MM (+ graph: time series).
  o General service usage frequency: 2-3 times per month (+ graph: line chart).
  o Transaction time analysis: between afternoon and evening (+ graph: bar chart).
  o Transaction day analysis: 70% on Friday, 25% on Saturday, 5% other days (+ graph: pie chart).
  o Any account number associated with service: yes
  o Any phone number associated with service: not available
  o Any SSN associated with service: not available
- Exceptions:
  o No transaction in month of February YYYY, contrary to usual pattern.
  o 5 transactions in month of April YYYY, contrary to usual pattern.
  o 1 out of pattern phone number associated with transaction on particular dd-mmm-yyyy.

APPLICATION D
.
.

APPLICATION E
.
.

*FIG. 8*

Migration Results — 395

- Application A has been successfully migrated from phone number XXX to phone number YYY. Confirmation received on dd-mmm-yyyy.
- Application B is under migration from phone number XXX to phone number YYY. Confirmation not received. Request raised on dd-mmm-yyyy.
- Application C will not be handled by this migration assistant. This application requires manual user intervention to enable migration.
- Application D has been last used on dd-mmm-yyyy and is presently inactive. This application, if necessary for migration, requires re-activation.
- Application E is probably under maintenance. This migration assistant has failed to communicate with this application.
- Application F has been successfully migrated from phone number XXX to phone number YYY. Confirmation received on dd-mmm-yyyy.
- Application G ...
- Application H ...

*FIG. 10*

LISTING SERVICE REGISTRATIONS THROUGH A MOBILE NUMBER

BACKGROUND

Mobile applications typically have a compulsory/optional step for users to register that involves entering email addresses and mobile numbers. For some applications, registration is an obvious requirement for accessing certain functionality. For example, banking applications may be able to locate the nearest ATM without registration, but to display account information, users must be registered. While application developers wish to keep the registration process simple, some applications may make customers uncomfortable with a process that is too short because the process does not seem secure. As such, application developers attempt to provide an easy registration process while also ensuring users that the registration process is secure.

Over time, mobile device users may download and register with many applications. Typically, a user's many applications are tied to the user's mobile device/phone number. The user, however, may be required to change mobile numbers due to geographical location changes or for personal reasons. When a user changes his/her number, the user usually prefers to update the new number with the individual services or initiate a request to respective authorities. Unfortunately, the user may find it difficult to recall which services he/she needs to update before deactivating the user's old mobile number.

BRIEF SUMMARY

According to one embodiment of the present disclosure, an approach is provided in which an information handling system identifies registration-based messages sent from services over a computer network to a mobile device. The registration-based messages correspond to registering a first mobile number assigned to the mobile device to the plurality of services. The information handling system then combines registration information extracted from each of the registration-based messages into a set of registration results. Next, the information handling system identifies a set of transaction results corresponding to transactions between the first mobile number and at least one of the services, and generates an analytics report based on performing statistical analysis on the set of transaction results and the set of registration results. In turn, the information handling system provides the set of registration results and the analytics report to a user assigned to the mobile number.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is an exemplary diagram depicting a list of messages sent to a user's mobile number and collected by a listing service registration manager;

FIG. 8 is an exemplary diagram depicting analytics results generated by a listing service registration manager;

FIG. 10 is an exemplary diagram depicting a set of migration results generated by a listing service registration manager.

DETAILED DESCRIPTION

Figure 1:
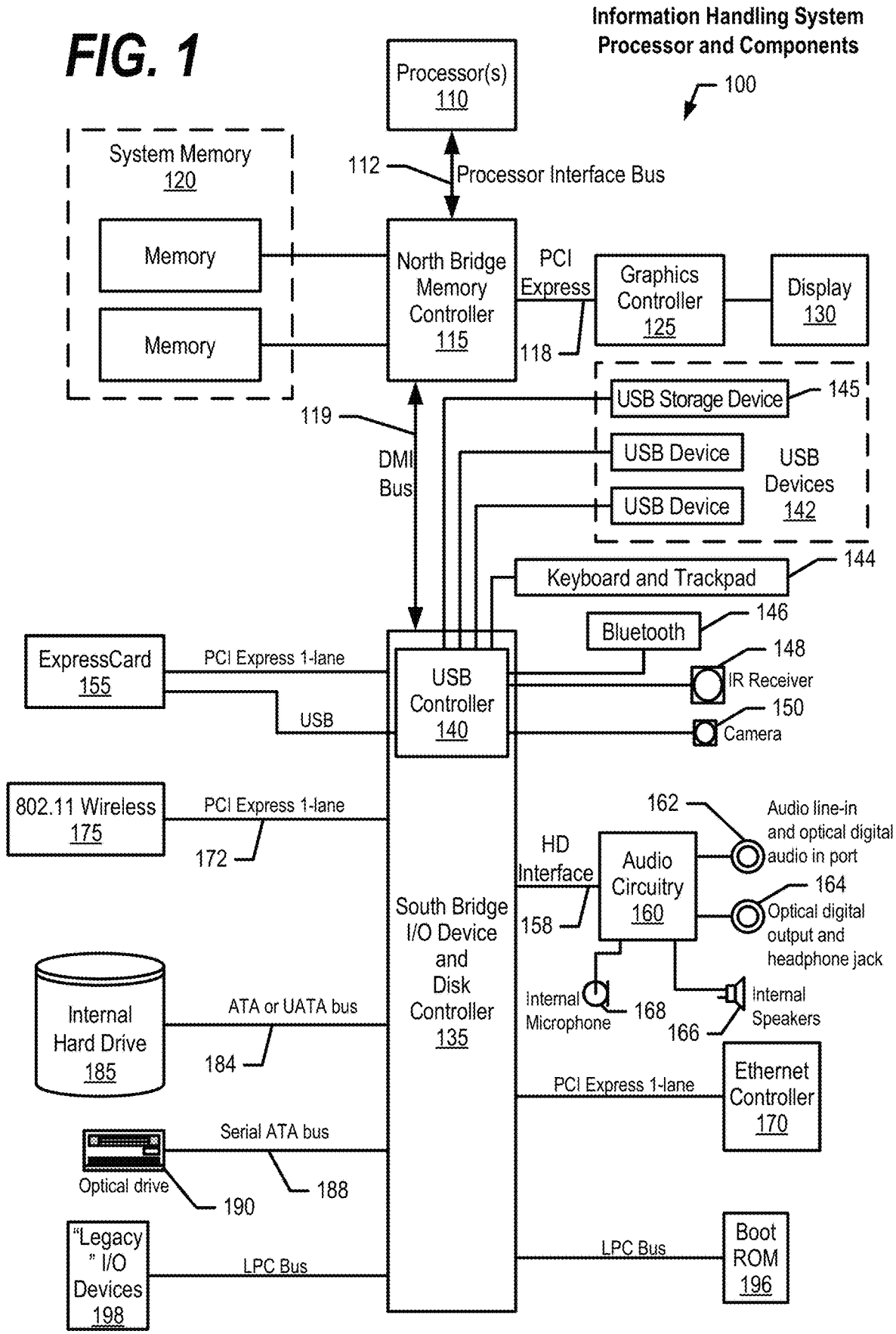
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
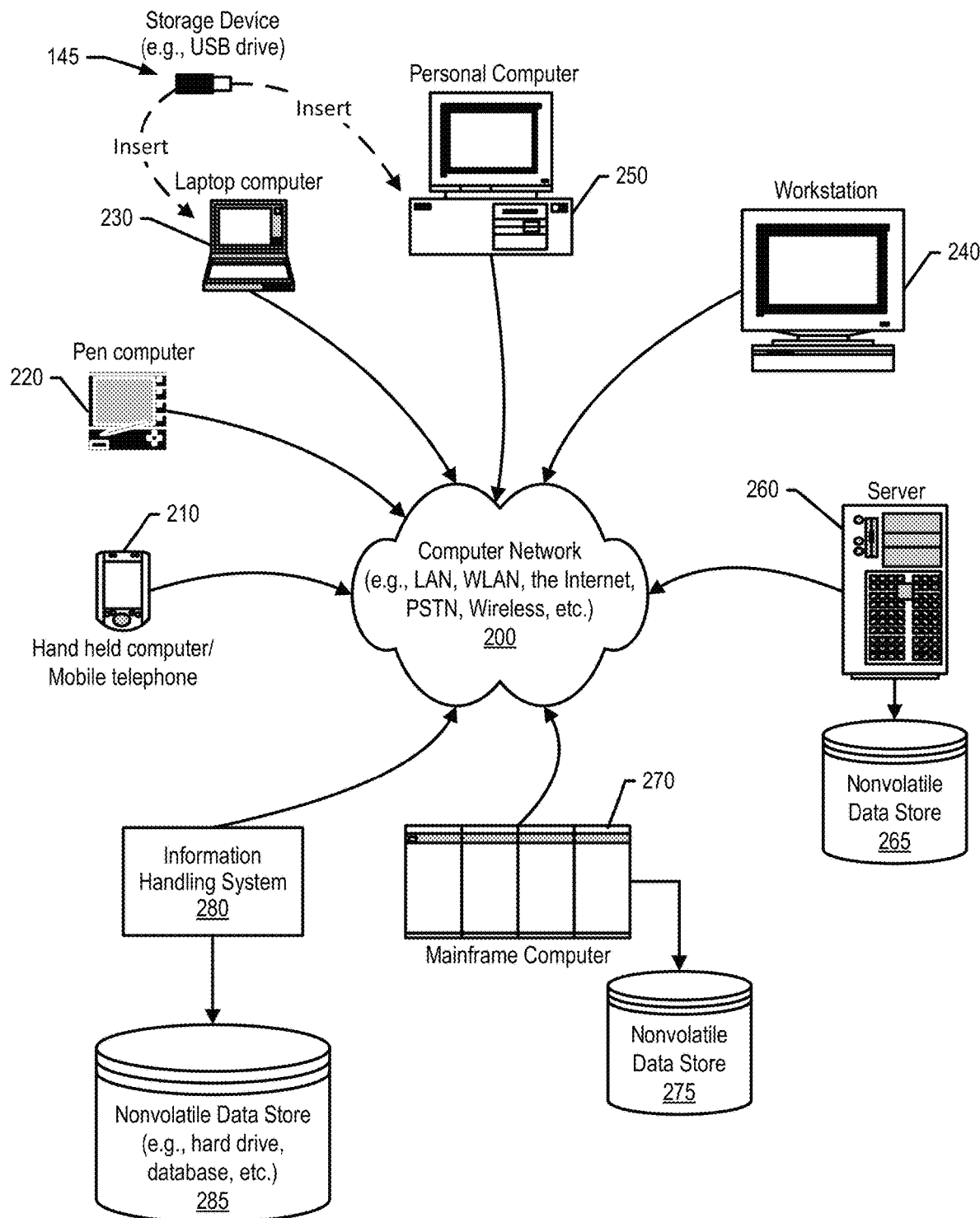
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 10 disclose an approach that can be implemented on an information handling system. At any point in time, mobile users are able to identify which applications/services they are registered with their own mobile number. An automated cognitive approach is disclosed herein that creates a chronological list and communication frequency of the services registered with a particular mobile number to the authorized user registered with that mobile number. The cognitive solution includes the capability of extracting concepts and information out of incoming text messages and presenting the output in a user friendly summarized nature.

Figure 3:
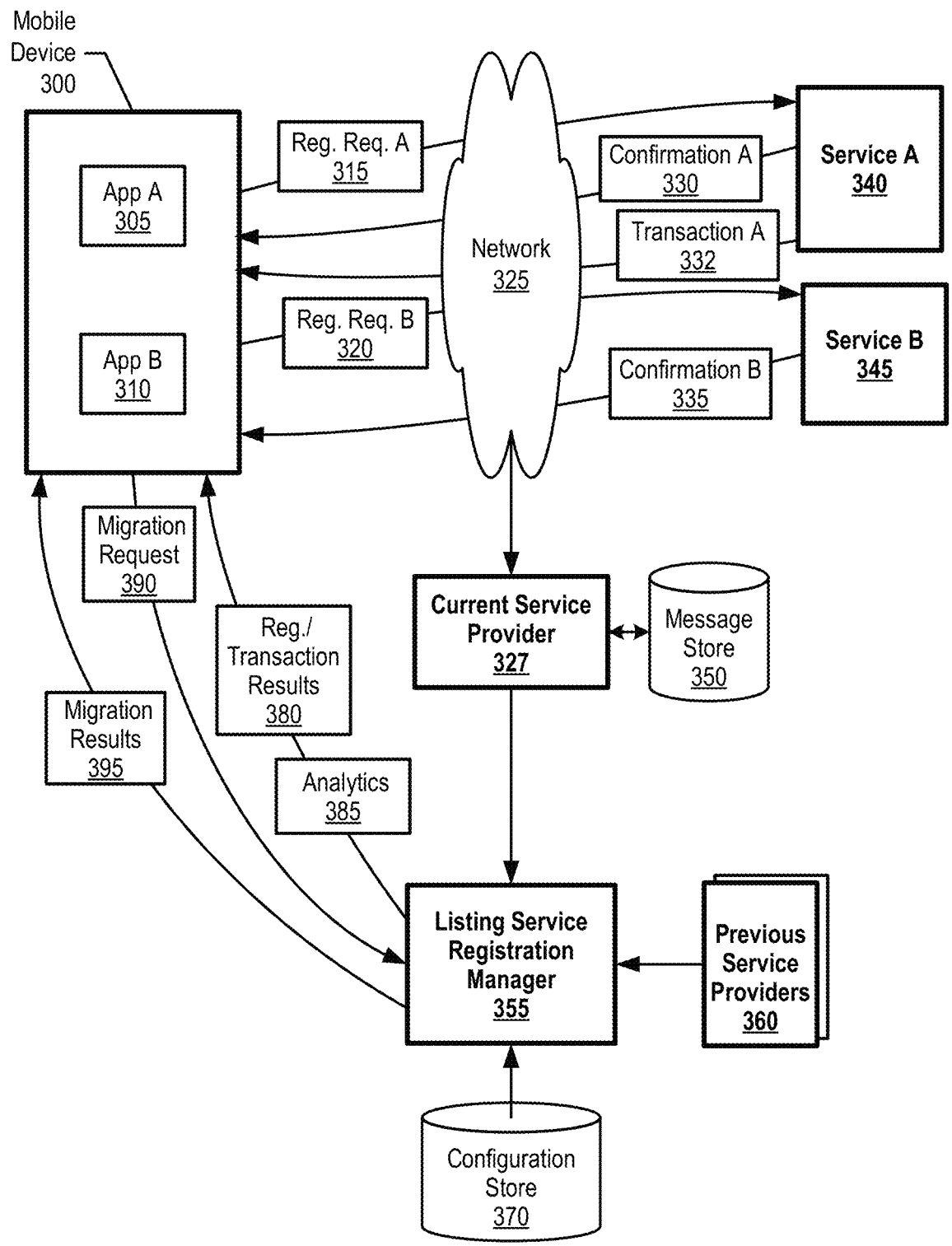
FIG. 3 is an exemplary diagram depicting a listing service registration manager that tracks service registrations on a per mobile number basis.

FIG. 3 is an exemplary diagram depicting a listing service registration manager that tracks service registrations on a per mobile number basis. Mobile device 300 includes application A 305 and application B 310. The applications register with their corresponding service A 340 and service B 345 by sending registration request A 315 and registration request B 320 over network 325, which is current service provider 327's network. Typically, each successful service/application registration with a mobile number is followed by at least one message from the service/application to the requesting mobile number. As such, service A 340 sends confirmation A 330 and service B 345 sends confirmation B 335 over current service provider 325's network.

Current service provider 327 captures incoming messages 330 and 335 and stores the incoming messages in message store 350. In addition, current service provider 327 captures each incoming message targeted to mobile device 300. FIG. 3 shows that service A 340 sent transaction A 332 to mobile device 300, indicating that the user performed a transaction using application A 305.

When requested, listing service registration manager 355 collects each incoming message sent to mobile number from across service providers and mobile device storages. This includes collecting messages from mobile device 300's previous service providers 360 as well as collecting messages from mobile device 300's internal storage.

Listing service registration manager 355 filters the collected messages using positive and negative keywords stored in configuration store 370, and may also use a tone recognition model to determine sentence context of the collected messages (see FIGS. 4-7 and corresponding text for further details). In turn, listing service registration manager 355 identifies registration-based messages, extracts registration information from the registration-based messages, and combines the extracted registration information into a set of registration results, which may also include a set of transaction results (registration/transaction results 380). In one embodiment, registration-based messages include registration confirmation only information. In another embodiment, registration-based messages may also include transaction messages having transaction information between mobile device 300 and application services. Listing service registration manager 355 also analyzes the filtered messages and generates analytics 385, which may include usage patterns, statistical summaries, and/or a mobile number migration interface that allows a user to migrate the mobile device's registrations to a different mobile number (see FIG. 9 and corresponding text for further details).

When the user of mobile device 300 wishes to migrate services to a different mobile number or a different device, the user uses the migration interface to send migration request 390 to listing service registration manager 355, indicating which applications should be migrated. Listing service registration manager 355, in turn, migrates the applications to the user's different phone number and provides migration results 395 accordingly (see FIG. 10 and corresponding text for further details).

Figure 4:
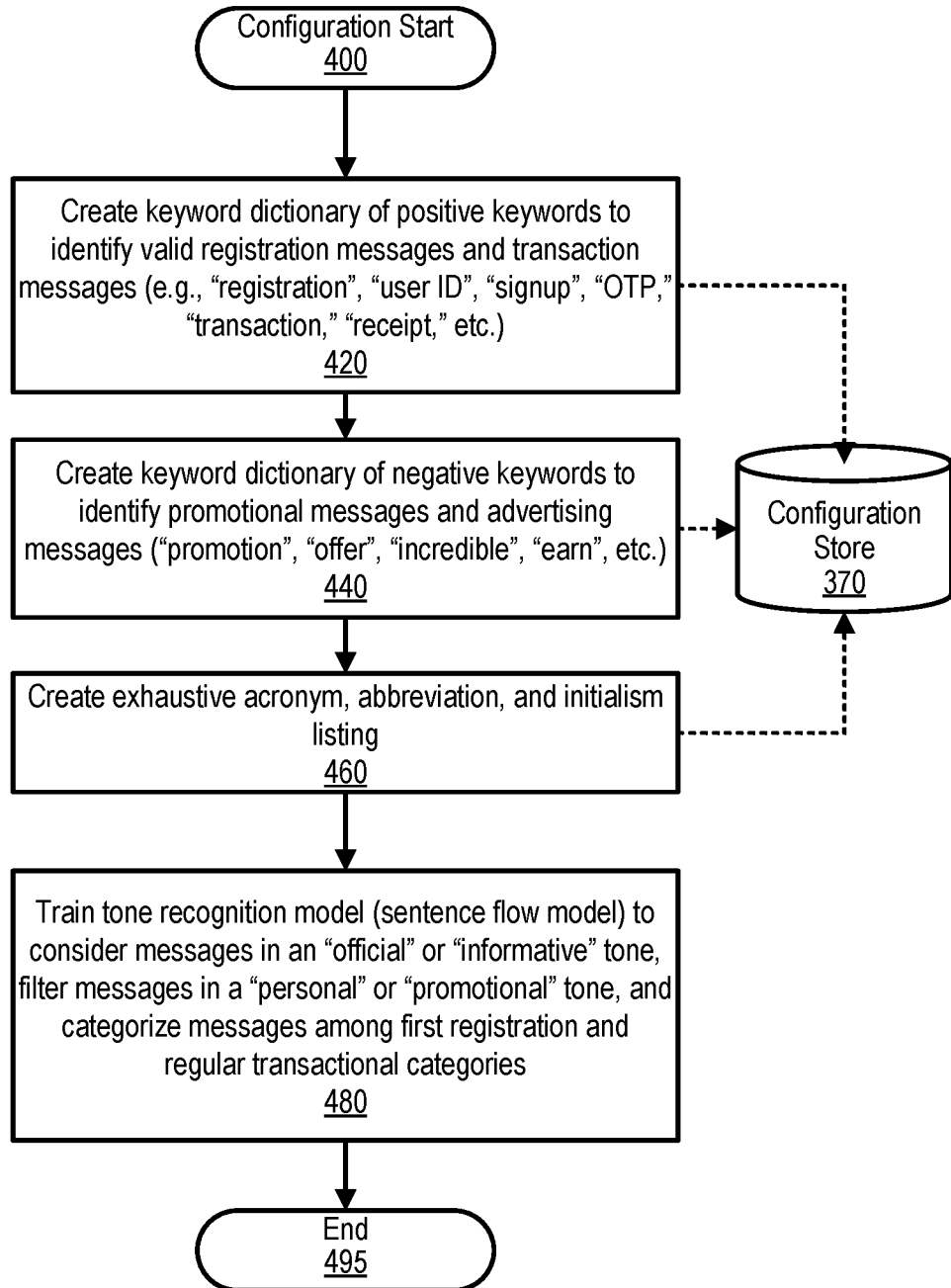
FIG. 4 is an exemplary flowchart showing steps taken to configure a keyword dictionary and train a tone recognition model for use by the listing service registration manager.

FIG. 4 is an exemplary flowchart showing steps taken to configure a keyword dictionary and train a tone recognition model for use by the listing service registration manager. FIG. 4 processing commences at 400 whereupon, at step 420, the process creates a keyword dictionary of positive keywords to identify valid registration messages and transaction messages, such as "registration", "user ID", "signup", "OTP," "transaction," "receipt," etc. Listing service registration manager 355 uses the positive keywords to identify those messages that correspond to service registrations and transactions. The process stores the positive keyword dictionary in configuration store 370.

At step 440, the process creates a keyword dictionary of negative keywords to identify promotional messages and advertising messages, such as "promotion", "offer", "incredible", "earn", etc. Listing service registration manager 355 uses the negative keywords to filter out the promotional messages and advertising messages. The process stores the negative keyword dictionary in configuration store 370.

At step 460, the process creates an exhaustive acronym, abbreviation, and initialism listing that listing service registration manager 355 uses to evaluate the context of the collected messages. The process stores the listing in configuration store 370.

At step 480, in one embodiment, the process trains a tone recognition model (sentence flow model) to determine whether messages are written in an "official" or "informative" tone, to filter messages having a "personal" or "promotional" tone, and to categorize messages among first registration and regular transactional categories. FIG. 4 processing thereafter ends at 495.

Figure 5:
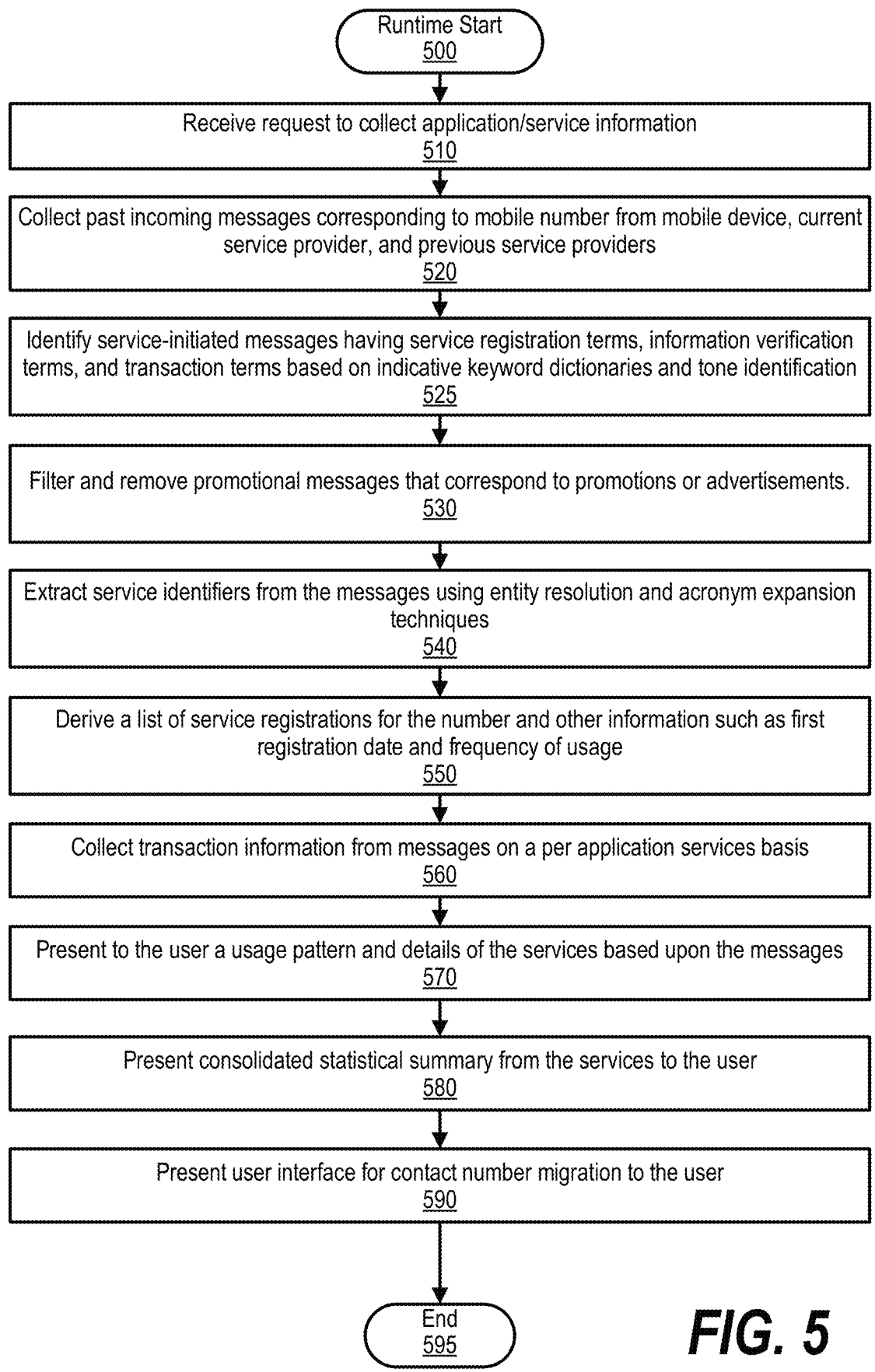
FIG. 5 is an exemplary flowchart showing steps taken to extract concepts and information out of text messages and present the results to a user in a user friendly format.

FIG. 5 is an exemplary flowchart showing steps taken to extract concepts and information out of text messages and present the results to a user in a user friendly format. FIG. 5 processing commences at 500 whereupon, at step 510, the process receives a request from a user to collect application/service information. At step 520, the process collects messages from the user's mobile device, the user's current service provider, and the user's previous service providers, which were sent to the user's mobile number (see FIG. 6 and corresponding text for further details).

At step 525, the process identifies service-initiated messages, from the collected messages, which are messages having service registration terms, information verification terms, and transaction terms based on the positive keyword dictionaries and/or tone identification from the tone recognition model. At step 530, the process filters and removes promotional or advertising messages based on the negative keyword dictionary and/or tone recognition model that do not include service membership information.

At step 540, the process extracts organization names from the messages using entity resolution and acronym expansion techniques based on the acronym, abbreviation, and initialism listing. At step 550, the process derives a list of service registrations from the filtered messages of the mobile number and other information such as first registration dates and frequency of usage. At step 560, the process collects transaction information from messages on a per application/services basis and, at step 570, the process presents a usage pattern to the user and details of the services based upon the messages (see FIG. 7 and corresponding text for further details). At step 580, the process presents consolidated statistical summary from the services to the user. At step 590, the process presents user interface for mobile number migration to the user (see FIGS. 8, 9, and corresponding text for further details). FIG. 5 processing thereafter ends at 595.

FIG. 6 is an exemplary diagram depicting a list of messages sent to a user's mobile number and collected by listing service registration manager 355. Collected messages 600 include messages 610 through 690, some of which may have been collect from current service provider 327, some of which may have been collected from previous service providers 360, and some of which may have been collected from mobile device 300's internal memory.

Listing service registration manager 355 analyzes collected messages 600 and filters them according to their content. Message 610 includes the term "register," which indicates that the message corresponds to a service registration. As such, listing service registration manager 355 extracts the date and application name from message 610. Message 620 includes the term "registered," which also indicates that the message corresponds to a service registration. As such, listing service registration manager 355 extracts the date and application name from message 620.

Message 630 includes the phrase "free gift," which indicates that the message corresponds to a promotion. As such, listing service registration manager 355 filters out message 630 from further analysis. Message 640 includes the terms "purchasing" and "$125," which indicate that the message corresponds to a transaction. As such, listing service registration manager 355 extracts the date, application name, and transaction information from the message.

Message 650 includes the phrase "service request," which indicates that the message corresponds to a service registration. As such, listing service registration manager 355 extracts the application name from the message. Message 660 includes the phrase "satisfaction score," which indicates that the message corresponds to a survey. As such, listing service registration manager 355 filters out message 660 from further analysis.

Message 670 includes the term "approved," which indicates that the message corresponds to a transaction. As such, listing service registration manager 355 extracts the application name and transaction information from the message. Message 680 includes the term "payment," which indicates that the message corresponds to a transaction. As such, listing service registration manager 355 extracts the application name and transaction information from the message. And, message 690 includes the term "order," which indicates that the message corresponds to a transaction. As such, listing service registration manager 355 extracts the application name and transaction information from the message.

Figure 7:
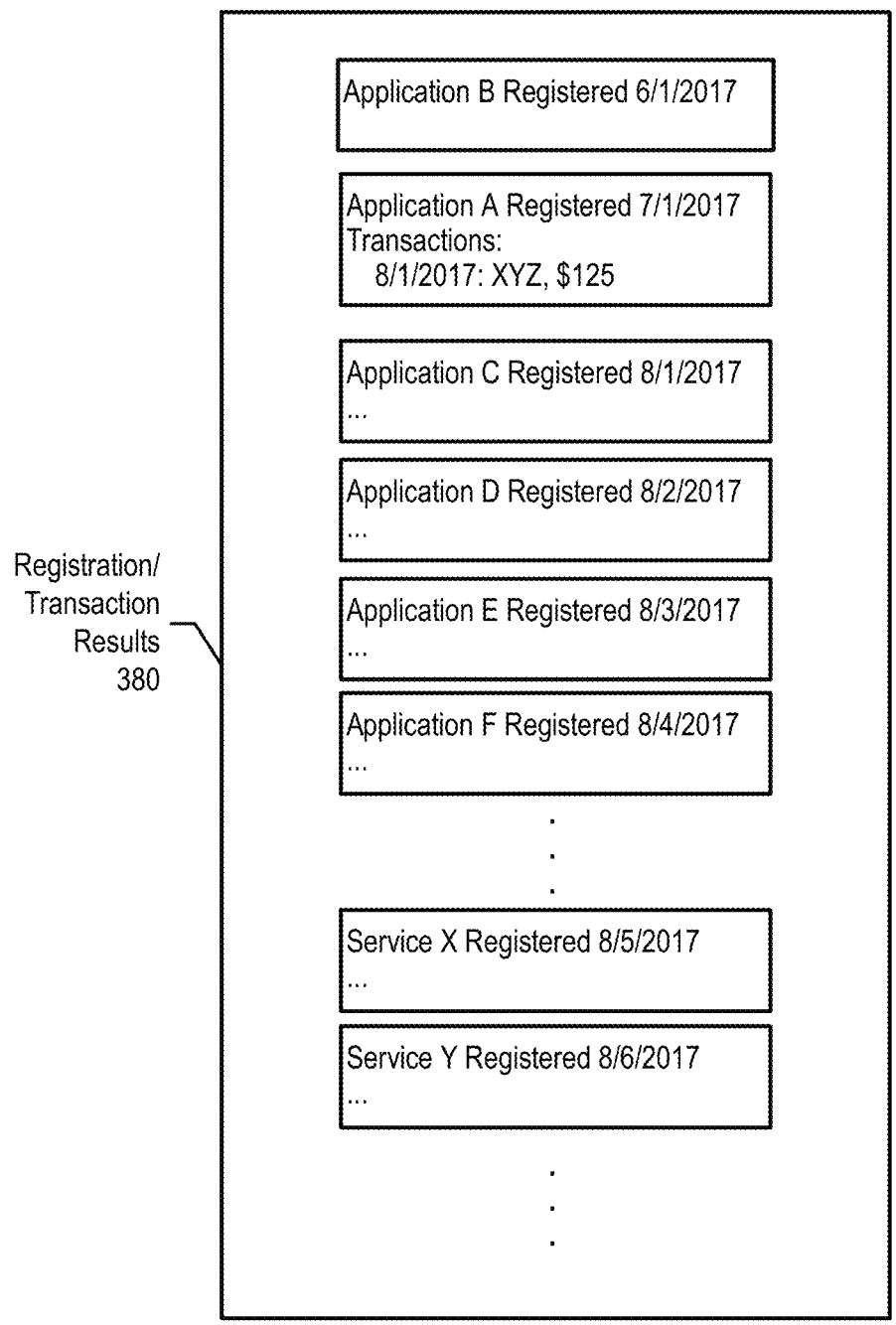
FIG. 7 is an exemplary diagram depicting registration/transaction results generated by a listing service registration manager.

Once listing service registration manager 355 analyzes collected messages 600, listing service registration manager 355 creates a user friendly registration and transaction results (see FIG. 7 and corresponding text for further details).

In one embodiment, listing service registration manager 355 or another entity pre-compiles a dictionary as discussed herein comprising positive keywords and negative keywords. Messages are then considered for further analysis that include terms matching one or more of the positive keywords, and messages are filtered out that include terms matching one or more of the negative keywords.

In another embodiment as discussed herein, listing service registration manager 355 may use a pre-trained English tone recognition model (sentence flow model). The model considers messages for further analysis that have an "official" or "informative" tone and filters out messages that have "personal" or "promotional" tone. The model then categorizes the messages among first registration and regular transactional categories.

FIG. 7 is an exemplary diagram depicting registration/transaction results generated by listing service registration manager 355. Listing service registration manager 355 evaluates collected messages as discussed herein and creates a set of registration results that, in one embodiment, includes registration and transaction information organized by application service in a chronological manner.

FIG. 8 is an exemplary diagram depicting analytics results generated by listing service registration manager 355. Analytics 385 includes information organized on a per application basis. From an application's registration date onwards, analytics 385 may include a summary of the frequency and total number of interactions per applications. If the interactions are of financial nature, analytics 385 may include a summary of incoming and outgoing funds related to the service (in actual or virtual currency). Analytics 385 may also include information such as usage tendencies at a particular hour of the day, a particular season, specific days of month, year or week, specific day or time around external events, dependency on a personal event, etc.

Figure 9:
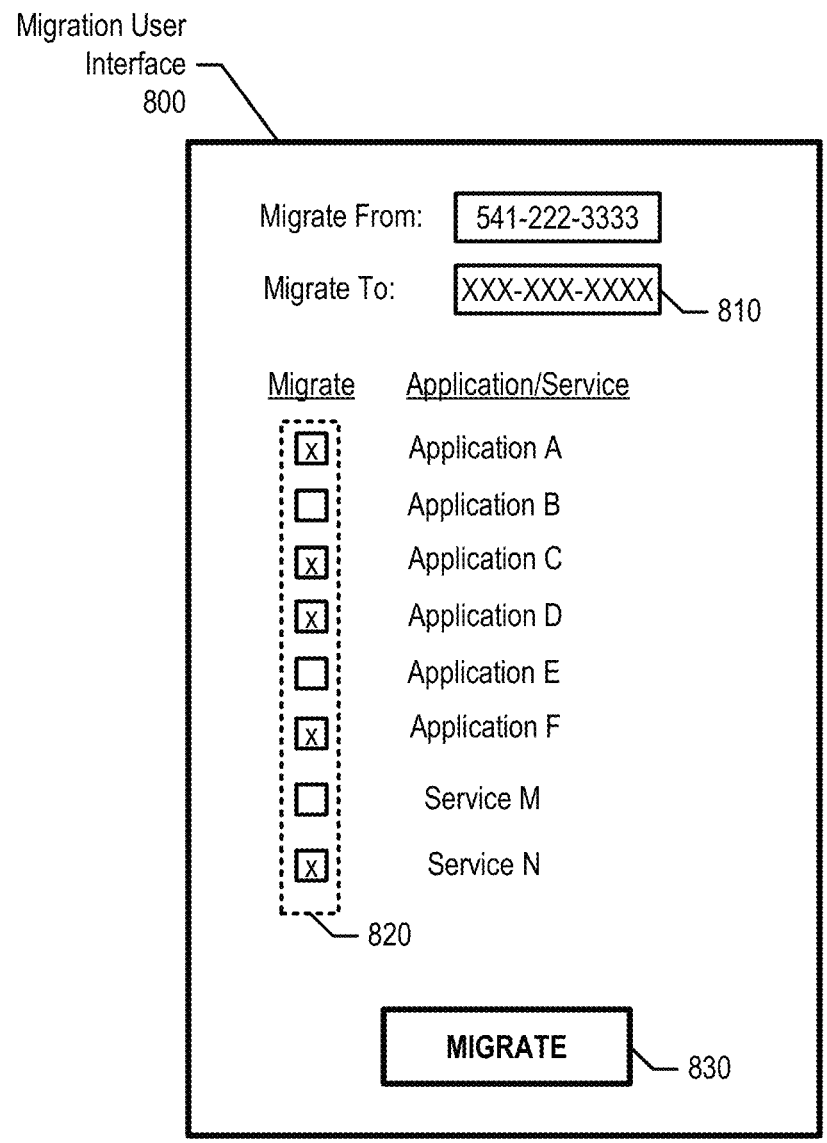
FIG. 9 is an exemplary diagram depicting a migration user interface to migrate application/service registration information to a different mobile number.

FIG. 9 is an exemplary diagram depicting a migration user interface to migrate application/service registration information to an alternative mobile number. Migration user interface 800 enables a user to easily select which applications/services to migrate to a new mobile number. The user enters the new mobile number in text box 810 and selects which applications to migrate to the new number via selection boxes 820. The user selects button 820 and listing service registration manager 355 migrates the selected applications/services to the new mobile number. In one embodiment, the selected applications/services are sent a standardized notification, thus easing the effort on part of the user. In this embodiment, some services may allow the mobile number modification using standard message based identity verification, whereas other services may require more detailed verification. Accordingly, the responses from the services may be consolidated and presented to the user in two categories, such as "migration complete" and "further action necessary".

FIG. 10 is an exemplary diagram depicting migration results generated by listing service registration manager 355. Listing service registration manager 355 generates migration results 395 and provides them to a user to inform the user of the migration process. In one embodiment, listing service registration manager 355 provides an open window to the user so the user can view the progress of the migration. In another embodiment, listing service registration manager 355 provides migration results 395 to the user after listing service registration manager 355 has migrated (or attempted to migrate) each of the selected applications/services to migrate.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

identifying a plurality of registration-based messages sent from a plurality of services over a computer network to a mobile device assigned to a first mobile number, wherein the plurality of registration-based messages correspond to registering the first mobile number to the plurality of services;

combining registration information extracted from each of the plurality of registration-based messages into a set of registration results;

identifying a set of transaction results corresponding to one or more transactions between the first mobile number and at least one of the plurality of services;

generating an analytics report based on performing statistical analysis on the set of transaction results and the set of registration results; and providing the set of registration results and the analytics report to a user assigned to the first mobile number.

2. The method of claim 1 further comprising:

in response to providing the registration results to the user, receiving a request from the user to migrate a selected set of the plurality of services to a second mobile number;

automatically registering the second mobile number to the selected set of the plurality of services; and providing a set of migration results to the user that indicate the second mobile number is registered to one or more of the selected set of the plurality of services.

3. The method of claim 1 further comprising:

collecting, from a plurality of service providers, a plurality of incoming messages sent to the first mobile number;

identifying a set of transaction messages included in the plurality of incoming messages, wherein the set of transaction messages correspond to the one or more transactions between the first mobile number and at least one of the plurality of services;

combining transaction information extracted from the set of transaction messages into the set of transaction results; and providing the set of transaction results to the user.

4. The method of claim 3 wherein the analytics report is organized based on the plurality of services.

5. The method of claim 1 wherein the identifying of the plurality of registration-based messages further comprises:

collecting, from a plurality of service providers, a plurality of incoming messages sent to the first mobile number; and filtering the plurality of incoming messages, wherein the filtering further comprises:

selecting, from the plurality of incoming messages, a plurality of service-initiated messages that each comprise at least one term that matches a set of registration terms included in a positive keyword dictionary; and filtering out at least one of the plurality of service-initiated messages that includes at least one term that matches a set of promotional terms included in a negative keyword dictionary.

6. The method of claim 5 wherein the filtering further comprises:

analyzing the plurality of incoming messages using a tone recognition model to filter out at least one of the plurality of service-initiated messages exhibiting a personal tone.

7. The method of claim 5 wherein at least one of the plurality of service providers is a current service provider of the mobile device, and wherein at least one of the plurality of service providers is a prior service provider of the mobile device.

8. An information handling system comprising:

one or more processors;

a memory coupled to at least one of the processors;

a set of computer program instructions stored in the memory and executed by at least one of the processors in order to perform actions of:

identifying a plurality of registration-based messages sent from a plurality of services over a computer network to a mobile device assigned to a first mobile number, wherein the plurality of registration-based messages correspond to registering the first mobile number to the plurality of services;

combining registration information extracted from each of the plurality of registration-based messages into a set of registration results;

identifying a set of transaction results corresponding to one or more transactions between the first mobile number and at least one of the plurality of services;

generating an analytics report based on performing statistical analysis on the set of transaction results and the set of registration results; and providing the set of registration results and the analytics report to a user assigned to the first mobile number.

9. The information handling system of claim 8 wherein the processors perform additional actions comprising:

in response to providing the registration results to the user, receiving a request from the user to migrate a selected set of the plurality of services to a second mobile number;

automatically registering the second mobile number to the selected set of the plurality of services; and providing a set of migration results to the user that indicate the second mobile number is registered to one or more of the selected set of the plurality of services.

10. The information handling system of claim 8 wherein the processors perform additional actions comprising:

collecting, from a plurality of service providers, a plurality of incoming messages sent to the first mobile number;

identifying a set of transaction messages included in the plurality of incoming messages, wherein the set of transaction messages correspond to the one or more transactions between the first mobile number and at least one of the plurality of services;

combining transaction information extracted from the set of transaction messages into the set of transaction results; and providing the set of transaction results to the user.

11. The information handling system of claim 10 wherein the analytics report is organized based on the plurality of services.

12. The information handling system of claim 8 wherein the processors perform additional actions comprising:

collecting, from a plurality of service providers, a plurality of incoming messages sent to the first mobile number; and filtering the plurality of incoming messages, wherein the filtering further comprises:
   selecting, from the plurality of incoming messages, a plurality of service-initiated messages that each comprise at least one term that matches a set of registration terms included in a positive keyword dictionary; and
   filtering out at least one of the plurality of service-initiated messages that includes at least one term that matches a set of promotional terms included in a negative keyword dictionary.

13. The information handling system of claim 12 wherein the processors perform additional actions comprising:
   analyzing the plurality of incoming messages using a tone recognition model to filter out at least one of the plurality of service-initiated messages exhibiting a personal tone.

14. The information handling system of claim 12 wherein at least one of the plurality of service providers is a current service provider of the mobile device,
   and wherein at least one of the plurality of service providers is a prior service provider of the mobile device.

15. A computer program product stored in a computer readable storage medium, comprising computer program code that, when executed by an information handling system, causes the information handling system to perform actions comprising:
   identifying a plurality of registration-based messages sent from a plurality of services over a computer network to a mobile device assigned to a first mobile number, wherein the plurality of registration-based messages correspond to registering the first mobile number to the plurality of services;
   combining registration information extracted from each of the plurality of registration-based messages into a set of registration results;
   identifying a set of transaction results corresponding to one or more transactions between the first mobile number and at least one of the plurality of services;
   generating an analytics report based on performing statistical analysis on the set of transaction results and the set of registration results; and
   providing the set of registration results and the analytics report to a user assigned to the first mobile number.

16. The computer program product of claim 15 wherein the information handling system performs further actions comprising:
   in response to providing the registration results to the user, receiving a request from the user to migrate a selected set of the plurality of services to a second mobile number;
   automatically registering the second mobile number to the selected set of the plurality of services; and
   providing a set of migration results to the user that indicate the second mobile number is registered to one or more of the selected set of the plurality of services.

17. The computer program product of claim 15 wherein the information handling system performs further actions comprising:
   collecting, from a plurality of service providers, a plurality of incoming messages sent to the first mobile number;
   identifying a set of transaction messages included in the plurality of incoming messages, wherein the set of transaction messages correspond to the one or more transactions between the first mobile number and at least one of the plurality of services;
   combining transaction information extracted from the set of transaction messages into the set of transaction results; and
   providing the set of transaction results to the user.

18. The computer program product of claim 17 wherein the analytics report is organized based on the plurality of services.

19. The computer program product of claim 15 wherein the information handling system performs further actions comprising:
   collecting, from a plurality of service providers, a plurality of incoming messages sent to the first mobile number; and
   filtering the plurality of incoming messages, wherein the filtering further comprises:
     selecting, from the plurality of incoming messages, a plurality of service-initiated messages that each comprise at least one term that matches a set of registration terms included in a positive keyword dictionary; and
     filtering out at least one of the plurality of service-initiated messages that includes at least one term that matches a set of promotional terms included in a negative keyword dictionary.

20. The computer program product of claim 19 wherein the information handling system performs further actions comprising:
   analyzing the plurality of incoming messages using a tone recognition model to filter out at least one of the plurality of service-initiated messages exhibiting a personal tone.

* * * * *